(12) United States Patent
Esslinger (10) Patent No.: US 8,608,412 B2
(45) Date of Patent: Dec. 17, 2013

(54) FEED MECHANISM FOR A BORING BAR

(76) Inventor: Thomas Esslinger, Langdon, NH (US)

(*) Notice: Subject to any disclaimer, the term of this patent is extended or adjusted under 35 U.S.C. 154(b) by 994 days.

(21) Appl. No.: 12/696,797

(22) Filed: Jan. 29, 2010

(65) Prior Publication Data
US 2010/0189522 A1    Jul. 29, 2010

Related U.S. Application Data

(60) Provisional application No. 61/148,097, filed on Jan. 29, 2009.

(51) Int. Cl.
*B23B 47/18* (2006.01)

(52) U.S. Cl.
USPC .......................................... 408/102; 408/137

(58) Field of Classification Search
USPC ................... 408/102, 137, 138, 141
IPC .......................................................... B23B 47/18
See application file for complete search history.

(56) References Cited

U.S. PATENT DOCUMENTS

| | | | | |
|---|---|---|---|---|
| 99,495 A | * | 2/1870 | Taft ................................ | 408/102 |
| 1,111,128 A | * | 9/1914 | Bowers ........................... | 74/151 |
| 1,115,402 A | * | 10/1914 | Coulter .......................... | 408/102 |
| 1,126,715 A | * | 2/1915 | Cuyler ............................ | 408/79 |
| 1,344,910 A | * | 6/1920 | Le Sueur ....................... | 408/102 |
| 1,813,785 A | * | 7/1931 | Weber ............................ | 408/111 |
| 2,683,375 A | * | 7/1954 | Gerentes ....................... | 74/22 R |
| 2,957,374 A | * | 10/1960 | Djidich et al. ................. | 408/11 |
| 3,075,415 A | * | 1/1963 | Dabringhaus .................. | 408/59 |
| 3,804,544 A | * | 4/1974 | Adams ............................ | 408/14 |
| 4,288,182 A | * | 9/1981 | Vandenkieboom et al. .. | 408/129 |
| 4,358,228 A | * | 11/1982 | Stark ............................... | 408/35 |
| 4,362,444 A | * | 12/1982 | Watkins .......................... | 408/17 |
| 4,406,566 A | * | 9/1983 | Bauer ............................. | 408/129 |
| 4,850,756 A | * | 7/1989 | Dubois ........................... | 408/72 R |
| 4,958,967 A | * | 9/1990 | Adachi ........................... | 409/185 |
| 4,990,037 A | * | 2/1991 | Strait .............................. | 408/72 R |
| D329,654 S | * | 9/1992 | Smith ............................. | D15/132 |
| 5,277,524 A | * | 1/1994 | Chung ............................ | 408/46 |
| 5,642,969 A | * | 7/1997 | Strait .............................. | 408/124 |
| 6,447,220 B1 | * | 9/2002 | Ricci et al. .................... | 408/72 R |
| 6,565,293 B2 | * | 5/2003 | Desmoulins .................... | 408/10 |

* cited by examiner

*Primary Examiner* — Eric A Gates
(74) *Attorney, Agent, or Firm* — Davis & Bujold, PLLC; Michael J. Bujold (57) ABSTRACT

A boring bar feed mechanism comprising a boring bar and a rotation mechanism for rotating the boring bar, a feed shaft, a feed coupling the feed shaft with the boring bar for axially translating the boring bar, and the boring bar is rotationally mounted with respect to but axially fixed to a second end of the feed coupler. A cam is rotationally fixed to the boring bar for rotating with the boring bar and a cam follower interacts with the cam. A plunger housing is supported by an extension of the cam follower and the plunger housing accommodates at least one feed plunger. A converter gear is supported by the feed shaft and the feed plunger interacts with the converter gear to facilitate indexing of the converter gear. The plunger housing is pivotally supported by the extension of the cam follower to permit the plunger housing and the feed plunger to have a limited pivoted motion, relative to the cam follower, as the cam follower oscillates back and forth and indexes the feed shaft.

13 Claims, 7 Drawing Sheets

FEED MECHANISM FOR A BORING BAR

This application claims priority from and is a continuation-in-part of U.S. provisional patent application Ser. No. 61/148,097 filed Jan. 29, 2009.

FIELD OF THE INVENTION

The present invention relates to a feed mechanism which facilities automatic feeding of a boring bar during rotation thereof.

BACKGROUND OF THE INVENTION

Heavy equipment and machinery frequently require repair and it is generally preferable that such repair be done in the field rather than transporting the machinery or equipment to a suitable repair facility as this reduces the associated time and cost required for repair. One of the most commonly required repairs for large machinery or equipment is the repair or refurbishing of a bore, that is, a circular opening that supports an axle or a shaft, for example, as these circular openings eventually become damaged or worn for a variety of reasons, including mechanical wear of the parts, thereby resulting in a need to restructure or reconstruct the bore to the proper diameter and shape. It may also be desirable to modify a bore for a number of reasons, such as reconstructing the bore to have a slightly larger or smaller diameter to accommodate a different sized shaft or axle.

The repair of a damaged or worn bore or the modification of a bore for any reasons typically involves first rebuilding the interior surface of the bore by deposition of a metal, typically by a welding or a flame deposition process, and the subsequent boring and machining of the rebuilt surface to reduce the rebuilt surface to the precisely required internal diameter. These operations are typically performed in the field by a portable boring machine which has a boring bar that is inserted into the bore to be repaired. The boring bar is typically supported on bearings, located on each side of the bore being repaired, and typically supports one or more exchangeable tools for repairing/refurbishing the bore, such as a welding head or a variety of cutting or machining tools for machining the surface of the bore being repaired.

The arrangement of the boring bar, supporting one or more bore repair tools and supported at each opposed end thereof by bearings, provides radial support and rigidity for the cutting or machining tools that is necessary for accurate reconstruction of the bore, but also presents other problems and shortcomings. For example, and in particular, the accurate reconstruction of a bore requires the accurate guidance of the mounted bore repair tool or tools through the bore to achieve the desired bore diameter and alignment as well as the desired machined finish for the interior surface of the bore.

The present invention provides a solution to these and other related problems of the prior art.

SUMMARY OF THE INVENTION

Wherefore, it is an object of the present invention to overcome the above mentioned shortcomings and drawbacks associated with the prior art.

Another object of the invention is to provide a boring bar mechanism which facilitates automatic axial incremental feeding or indexing of the boring bar as the boring bar rotates relative to a bore to be repaired.

A further object of the present invention is to provide a mechanism which facilitates disengagement of the axial indexing or feed mechanism of the boring bar, with respect to the housing, so that the boring bar can rotate without any axial movement being induced thereon and be moved into and out of the bore with ease.

Yet another object of the invention is to provide a boring bar mechanism which facilitates accurate control of the degree or amount of axial movement or indexing of the boring bar, with respect to the bore to be repaired, as the boring bar rotates during operation.

Still another object of the present invention is to provide a boring bar mechanism that is easy to set up and assists with both build up of a very uniform layer of material on the desired surface, typically a cylindrical surface to be repair or refurbished, and also assists with a very uniform removal of some of the deposited material from the desired surface to be repaired or refurbished.

A further object of the invention is to provide a boring bar mechanism which facilitates an infinitely variable control of the degree or amount of axial movement or indexing of the boring bar, with respect to the bore, as the boring bar rotates during operation.

A still further object of the present invention is to provide a boring bar mechanism with adjustable axial movement and indexing which is relatively inexpensive to manufacture but is durable, dependable and relatively easy to use.

Still another object of the invention is to provide a boring bar feed mechanism comprising a rotatable and axially translatable cylindrical boring bar having at least one tool holder located adjacent a working end of the boring bar for supporting at least one bore tool; a rotation mechanism for selectively rotating the boring bar in a rotational direction while allowing axial translation of the boring bar; an axial translation mechanism for axially translating the boring bar, the axial translation mechanism comprising a feed shaft extending parallel to and spaced from the boring bar and having a threaded section located at least adjacent the working end the boring bar and the threaded section extending over at least an axial length of the feed shaft corresponding to an axial range of motion of the boring bar; a feed coupling extending between and generally perpendicular to the feed shaft and the boring bar for axially translating the boring bar due to rotation of the feed shaft, the feed coupling comprising a threaded coupler rotationally and axially fixed into a first end of the feed coupling and engaging with the threaded section so that the feed coupling is driven in an axial direction along the feed shaft by rotation of the feed shaft; the boring bar being rotationally mounted within a coupling bore in a second end of the feed coupler and axially fixed in the coupling bore of the feed coupler so that the boring bar is axially moved by axial movement of the feed coupling upon rotation of the feed shaft; a cam being rotationally fixed to the boring bar for rotating with the boring bar; a cam follower, having an extension, interacting with the cam; a plunger housing being supported by the extension of the cam follower, and the plunger housing accommodating at least one feed plunger; a converter gear being supported by the feed shaft; and the at least one feed plunger interacting with the converter gear to facilitate indexing of the converter gear supported by the feed shaft; wherein the plunger housing is pivotally supported by the extension of the cam follower to permit the plunger housing and the feed plunger to have a limited pivoted motion relative to the cam follower as the cam follower oscillates back and forth and indexes the feed shaft.

BRIEF DESCRIPTION OF THE DRAWINGS

The invention will now be described, by way of example, with reference to the accompanying drawings in which.

DETAILED DESCRIPTION OF THE INVENTION

Figure 1A:
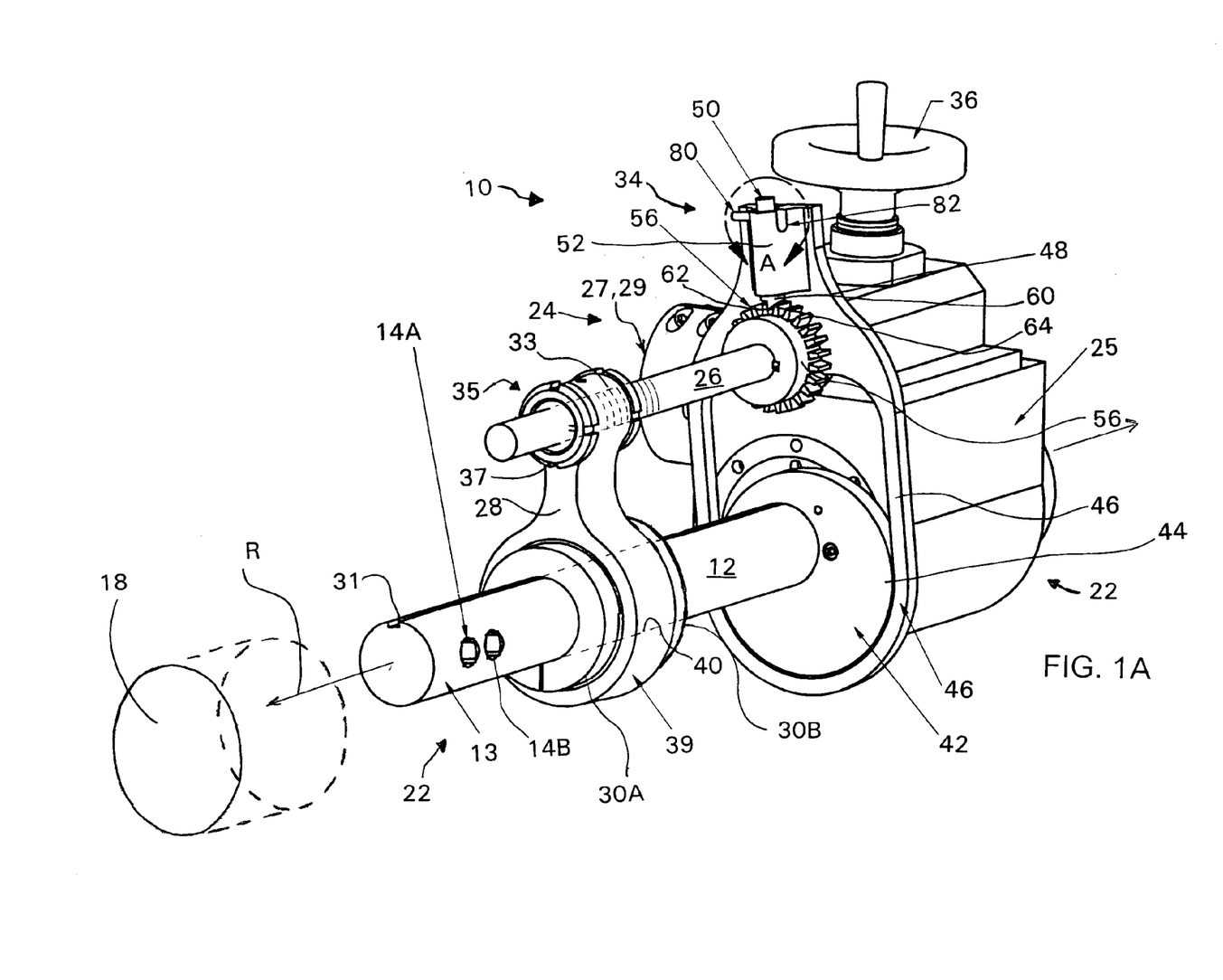
FIG. 1A is a diagrammatic perspective view showing various components of the boring bar mechanism according to the present invention.

Turning now to FIG. 1A, a diagrammatic representation of an exemplary boring bar mechanism 10, according to the present invention, is shown. As illustrated in FIG. 1A, the boring bar mechanism 10 includes a rotatable and axially translatable cylindrical boring bar 12 typically having at least one and more commonly two spaced apart tool apertures or holders 14A, 14B located adjacent a working end 13 of the boring bar 12 for mounting various tools, such as a variety of cutting, milling, machining or finishing tools (not shown), for preforming a desired cutting, milling, machining or finishing operation within a bore 18 being repaired or refurbished. As is well understood by those of ordinary skill in the relevant art, the operations which are preformed within or the interior surface on the bore 18, by the boring bar mechanism 10, typically requires the concurrent rotation as well as axial translation of the boring bar 12, and thus of the tool(s) mounted or supported by the tool holders 14A, 14B operates on successive axial sections of the bore 18. For this reason, the boring bar mechanism 10 will further include a boring bar rotation mechanism 22 for rotating the boring bar 12 as well as an axial translation mechanism 24 for incrementally axially moving the boring bar 12, in the axial direction, as the boring bar 12 rotates.

First considering the rotation mechanism 22, the boring bar 12 and thus the tool(s) mounted on the tool holder 14A or 14B are rotationally driven by a conventional gearbox 25 which, in turn, is driven by a conventional motor or some other drive mechanism 27 coupled to the gearbox 25, typically through a drive attachment coupling 29, both of which are well known in the art and thus only diagrammatically shown in FIG. 1A. The gearing of the gearbox 25 is typically coupled to the boring bar 12 to selectively rotate the boring bar 12 in either a clockwise or a counterclockwise rotational direction while allowing free axial translation of the boring bar 12, by means of an elongated axial keyway 31, formed in an exterior surface of the boring bar 12, and a corresponding key (not shown) that is coupled to associated gearing of the gearbox 25 to facilitate rotational driving of the boring bar 12. As such mechanisms for engaging the gearbox 25 with the boring bar 12, for rotationally driving the boring bar 12 while still allowing axial movement of the boring bar 12, are well known and commonly used in the relevant art, such features of the rotation mechanism 22 need not be, and are not, described in any further detail herein.

In the present exemplary embodiments of the boring bar mechanism 10, the boring bar 12 may typically have a diameter in the range of about 1 inch to about 3 inches and achieves axial movement in the range of about ½ inch to about 36 inches or more, and is generally rotated at a speed of between ½ and 300 revolutions per minute. It will be understood that the diameter, the axial movement range and the rotational speed range of the boring bar 12 will be determined by such factors as, for example, the size of the bore 18 being repaired or refurbished, the thickness and materials of the structural element located within the bore 18, the type of tool or tools which are mounted to the tool mountings 14A or 14B, the cutting, milling, machining or finishing operation being performed, and so forth. It will also be recognized that modifications and adaptations of the boring bar mechanism 10 to accommodate such factors will be well understood by those of ordinary skill in the art.

Next considering the axial translation mechanism 24, as described above, the boring bar 12 is gradually moved or indexed, in the axial direction, a small incremental distance along the rotational axis of the bore 18, as the boring bar 12 and thus the tool(s) is rotated within the bore 18 being repaired or refurbished. As a result of this, the selected operation, to be performed by the tool or tools, is gradually performed on the interior surface of the bore 18 along the desired entire axial length of the bore 18 being repaired or refurbished. In typical embodiments of the boring bar mechanism 10, the boring bar 12 is axially indexed at some point during each rotation of the boring bar 12, typically when the boring bar 12 either begins or completes rotation but may, alternatively, in certain applications may be axially indexed following either multiple rotations or a partial rotation of the boring bar 12.

As illustrated in FIG. 1A, the automatic axial translation mechanism 24, for facilitating automatic axial translation of the boring bar 12 during rotation of the boring bar 12, includes a feed shaft 26 which extends parallel to but is spaced apart from boring bar 12 and the feed shaft 26 has a threaded section 33 located along the end of the feed shaft 26, generally adjacent the end of boring bar 12 supporting the tool holders 14A, 14B. The threaded section 33 extends over at least an axial length of the feed shaft 26 that corresponds to the intended axial range of motion of the boring bar 12, typically between an inch or so to up to about 36 inches or so, e.g., typically a major portion of the length of the feed shaft 26.

As shown, the threaded section 33 of the feed shaft 26 is coupled to the boring bar 12 by a feed coupling 28 which extends between the feed shaft 26 and the boring bar 12, generally perpendicular to the feed shaft 26. The feed coupling 28 operates to convey axially the boring bar 12 in either direction, along the axis R of the feed shaft 26, and upon rotation of the feed shaft 26 in a corresponding direction. It will be appreciated that while the feed coupling 28 may be axially movable along the axes of the feed shaft 26 and the boring bar 12, the feed coupling 28 does not rotate with respect to either of the feed shaft 26 or the boring bar 12 because opposed the ends of the feed coupling 28 are, as shown in FIG. 1A and as described below, respectively coupled to the feed shaft 26 and the boring bar 12.

In a present exemplary embodiment of the boring bar mechanism 10, for example, the feed shaft 26 has a diameter between about ¼ to about 3 inches, more preferably a diameter of between about ¼ to about 3 inches, and most preferably a diameter of about ¾ of an inch and the threaded section 33 typically has a screw thread of between 4 and 40 threads per inch or so. As noted above, a majority of, if not the entire, axial length of the feed shaft 26 is threaded. It will be understood, however, that the diameter and the incremental angular rotational range and the thread pitch of the feed shaft 26 and the threaded section 33 will be determined by such factors as, for example, the size of the bore 18 to be repair or refurbished, the thickness and material of the structural element located within the bore 18, the tool(s) mounted to the tool mountings 14A, 14B, the cutting, milling, machining or finishing operation being performed, and so forth. It will also be recognized that modifications and adaptations of the boring bar mechanism 10 to accommodate such factors as well as other factors will be well understood by those of ordinary skill in the art.

Now considering the coupling between the feed coupling 28 and the threaded section 33 of the feed shaft 26, as diagrammatically illustrated in FIG. 1A for example, the first end 35 of the feed coupling 28 is threaded engaged with the threaded section 33 of the feed shaft 26 by a threaded coupler 37. The threaded coupler 37 is axially located within and fixed to the first end 35 of the feed coupling 28 so that the first end 35, and thereby the feed coupling 28, is driven in the axial direction along the feed shaft 26 and thereby in the axial direction with respect to the boring bar 12, as the feed shaft 26 gradually rotates. It will be appreciated that this function may be accomplished by a number of other possible configurations of the threaded coupler 37. For example, the threaded coupler 37 may have a generally polygon or polyangular outer circumference, similar to a hex-nut, and thereby rotationally and axially fitted into a correspondingly shaped cavity in the first end 35 of the feed coupling 28 and axially retained therein by, for example, a retaining cap, a washer fitting, a set screw, etc. Alternately, and again by way of example, the threaded coupler 37 may have a circular or polyangular outer circumference and may be axially and rotationally fixed into a circular or a circular cavity in the first end 35 of the feed coupling 28 by a set screw or a key locking bolt engaging both the threaded coupler 37 and the first end 35.

Now considering the coupling between a second end 39 of the feed coupling 28 and the boring bar 12, as shown in FIG. 1A, the second end 39 of the feed coupling 28 has a coupling bore 40 which extends through the second end 39 of the feed coupling 28 and the coupling bore 40 is coaxial with and of a suitable size to receive the boring bar 12. This allows the boring bar 12 to extend completely therethrough and rotate within the coupling bore 40. For this purpose, the coupling bore 40 may include an internal bearing (not shown), located between an interior surface of the coupling bore 40 and the exterior surface of the boring bar 12, to facilitate relative rotation between the boring bar 12 and the feed coupling 28. The boring bar 12 and the internal bearing—if included—is axially fixed to the feed coupling 28 by, for example, a pair of opposed locking collars 30A and 30B which are sandwiched on either side of the second end 39 of the feed coupling 28 so that the boring bar 12 will abut against one or the other of the locking collars 30A or 30B when the feed coupling 28 is axially moved, due to rotation of the feed shaft 26, thereby forcing the second end 39 of the feed coupling 28 against one of the locking collars 30A and 30B and causing the boring bar 12 to move axially in one direction or the other in conjunction with movement of the feed coupling 28. The axial movement of the first end 35 of the feed coupling 28, caused by rotation of the threaded section 33 of the feed shaft 26, acts upon the threaded coupler 37 and the resulting axial motion of the second end 39 of the feed coupling 28 and thereby causes a corresponding axial movement of the boring bar 12 and thus of the tool(s) mounted to the tool mounting 14A or 14B.

In summary, therefore, the boring bar 12 and thus the associated tool(s) are rotated in either direction within the bore 18 being repaired or refurbished by the drive mechanism 27 acting through the gearbox 25 while the boring bar 12 and the tool(s) are axially moved in either axial direction, within the bore 18, by axial motion of the feed coupling 28 caused by the rotation of the threaded section 33 of the feed shaft 26, which is translated by the threaded coupler 37 into either an advancing or a withdrawing axial motion of the feed coupling 28 and thus the boring bar 12, relative to the bore 18 being repaired or refurbished.

As described, the feed shaft 26, and thus the threaded section 33, are rotated by an incremental amount to axially advance or withdraw the boring bar 12 and the tool(s), relative to the bore 18 being repaired or refurbished, by a corresponding incremental amount during each rotation of the boring bar 12 by the drive mechanism 27 acting through the gearbox 25. In a present embodiment of the present invention, the feed shaft 26 is rotated between about 5 degrees and about 60 degrees, and more preferably between about 10 degrees and about 45 degrees, each time the boring bar 12 completes a single rotation.

The boring bar 12 is coupled to and drives the feed shaft 26, to incrementally rotate the feed shaft 26 selectively in either direction during rotation of the boring bar 12, by a cam mechanism 32 and a rotational, converter mechanism 34, as illustrated in FIGS. 1A-1D. As shown therein, the cam mechanism includes an eccentric cam 42 secured or affixed to the boring bar 12 so as to rotate with the boring bar 12 as the boring bar 12 rotates. A cam follower 46, having a cam opening 44 formed centrally therein, is rotationally mounted to the feed shaft 26. During operation of the boring bar 12, the cam follower 46 oscillates backward and forward, relative to the feed shaft 26, as the cam 42 is rotated by the boring bar 12.

The cam follower 46 is coupled to the feed shaft 26 via the rotational converter mechanism 34 which is mounted to and supported by an upward extension 48 of the cam follower 46, so that such oscillatory motion of the cam follower 46, about the feed shaft 26, is transformed by the rotational converter mechanism 34 into rotational or rotary motion of the feed shaft 26. As illustrated in FIGS. 1A-1D, the rotational converter mechanism 34 includes a feed plunger 50 (FIG. 1D) that is mounted in the converter housing 52 and the plunger 50 is resiliently biased, by a plunger spring 68, into engagement with teeth 57 of the converter gear 56. The converter gear 56 is rotationally and axially fixed to the feed shaft 26 by a set screw and a key 61, for example. The converter housing 52 is mounted to the upward extension 48 of the cam follower 46 so that the converter housing 52, and thus the feed plunger 50 as well, are repeatedly reciprocally rotated about a small angle A as the cam follower 46 oscillates due to rotation of the boring bar 12. The angle through which the upward extension 48 and the converter housing 52, and thus the feed plunder 50, are rotated is determined by, for example, the eccentricity of cam 42, the location of the center of rotation of cam follower 46 at the axis R of the boring bar 12 relative to the dimensions of the cam follower 46 and the distance between the axes of the boring bar 12 and the converter gear 56.

Figure 1B:
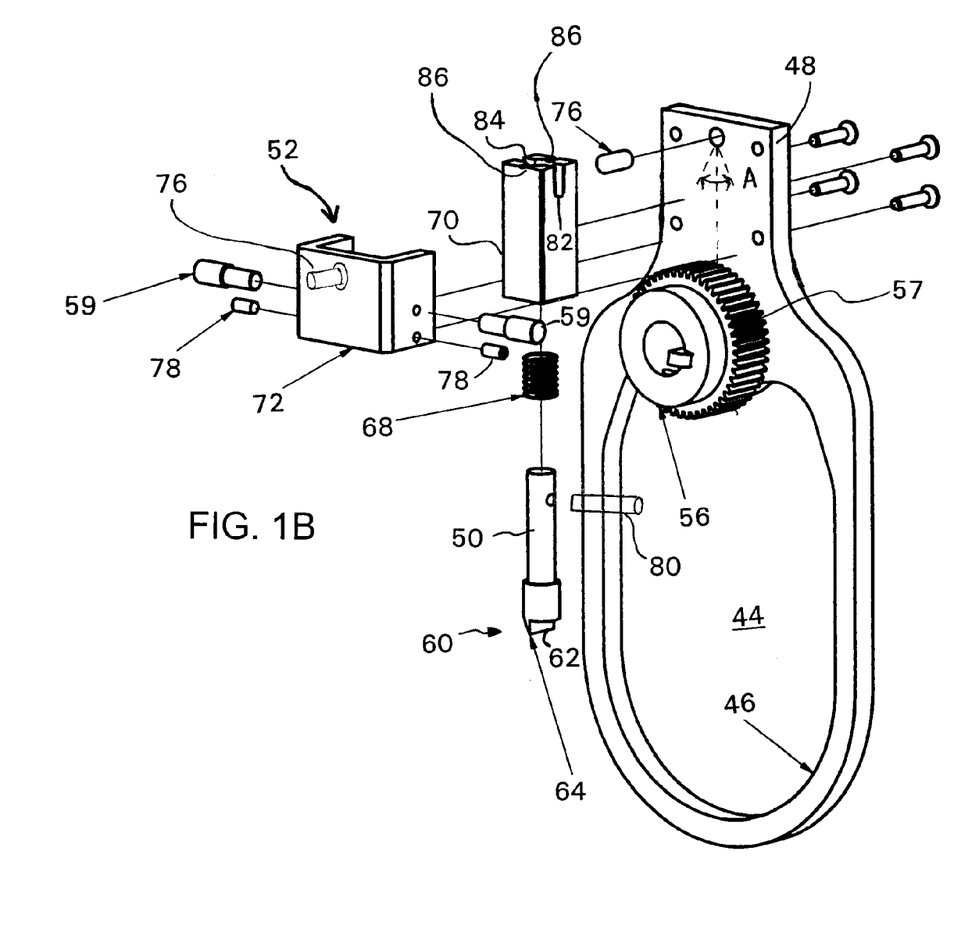
FIG. 1B is an exploded perspective view of showing the elements of the cam and the drive converter mechanism of the boring bar mechanism.
Figure 1C:
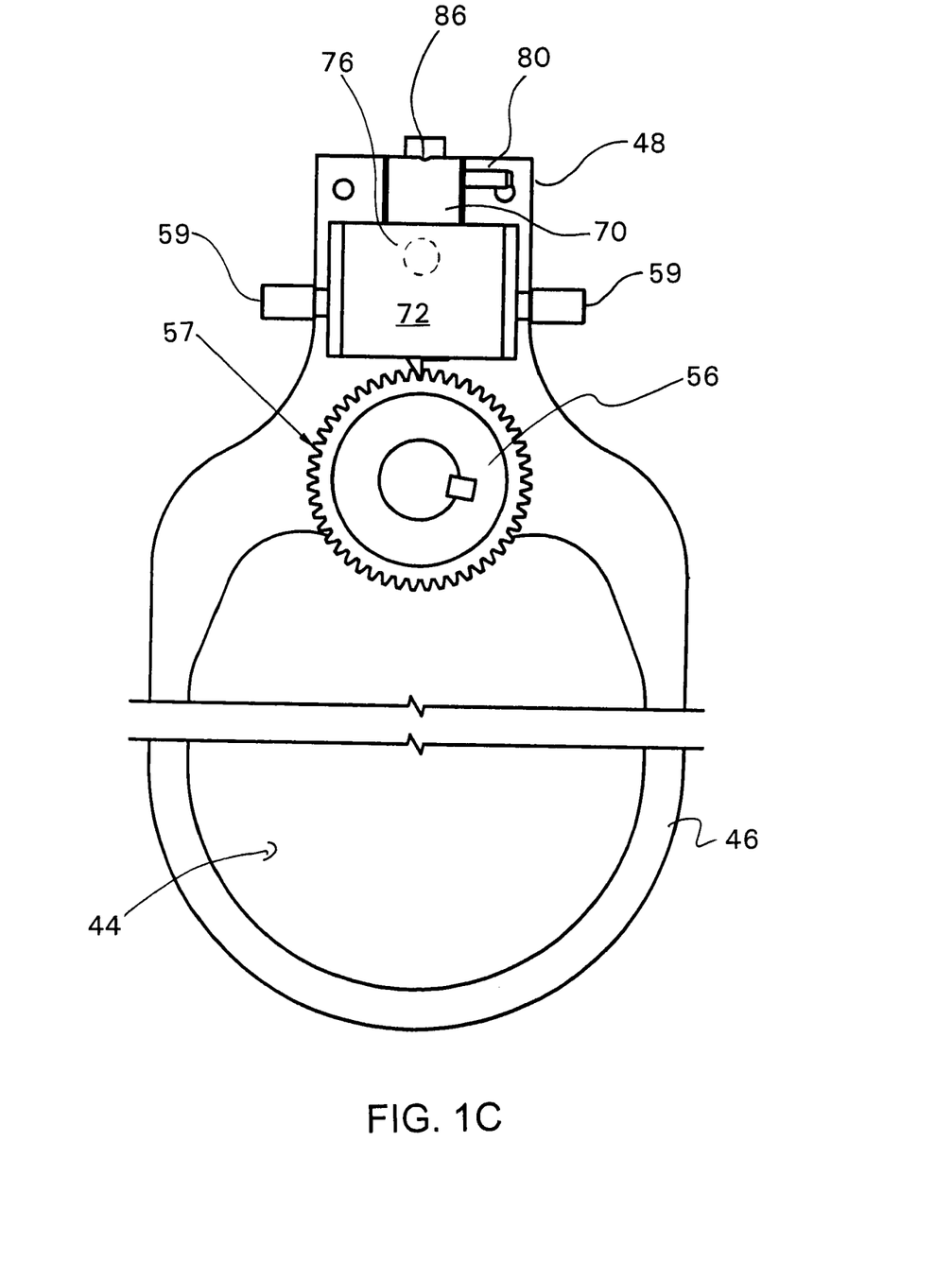
FIG. 1C is a front elevational view of the cam and the converter mechanism of FIG. 1B.
Figure 1D:
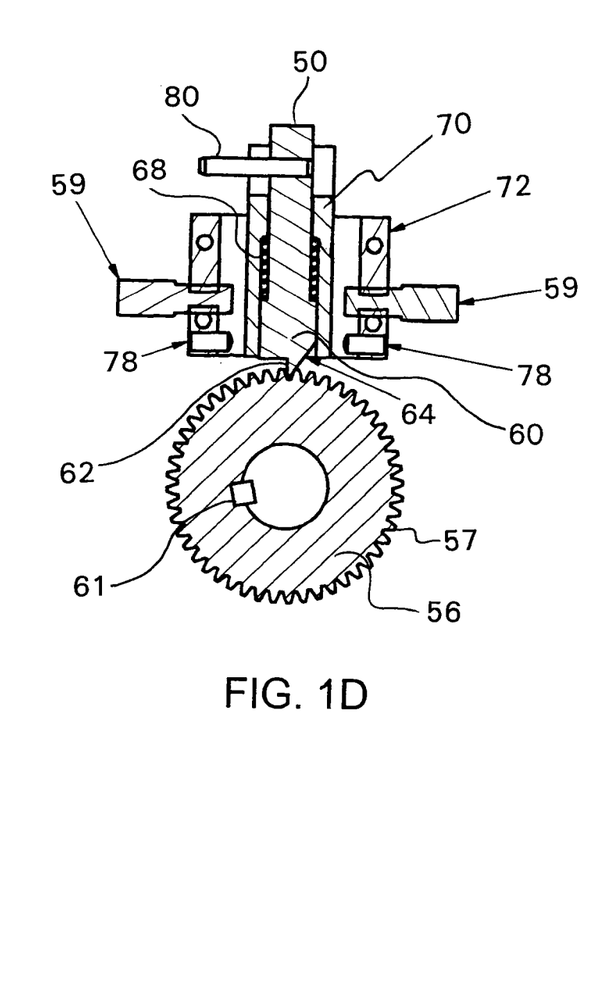
FIG. 1D is a diagrammatic cross sectional view showing the elements of the cam and the converter mechanism according of FIG. 1C and the degree of "play" or motion between the plunger housing and the converter housing.

As also illustrated in FIG. 1A and in further detail in FIGS. 1B, 1C and 1D, the gear engaging end 60 of the feed plunger 50 is formed as a wedge-like profile having a "flat" end side 62 that is generally parallel to and coincident with the axis of the feed plunger 50 and an "angled" end side 64 that extends at an angle to the axis of the feed plunger 50 (see FIG. 1D).

The gear engaging end 60 of the feed plunger 50 engages between a pair of teeth 57 of the converter gear 56 such that when the direction of oscillation of the upward extension 48, the converter housing 52, the plunger housing 70 and thus the feed plunger 50 is toward flat end side 62 of the feed plunger 50, the gear engaging end 60 will positively engage with a corresponding surface of an adjacent tooth 57 of the converter gear 56 in such a manner to initially cause the plunger housing 70 to pivot, about the plunger pivot pin(s) 76, until the plunger housing 70 abuts against one of the inwardly facing surfaces of the converter housing 52 (FIG. 1D shows the plunger housing 70 centered with respect to both of the inwardly facing surfaces of the converter housing 52 and spaced from the set screws 78 and thumb screws 59 adjustments). Once the plunger housing 70 "waddles" or pivots so as to abut against the converter housing 52, the plunger housing 70 and the feed plunger 50 both move along with the converter housing 52 during any further oscillating motion of the upward extension 48 and the converter housing 52 to rotate the converter gear 56 in that direction by an angle determined by the geometry and the centers of rotation of the cam follower 46, the boring bar 12 and the converter gear 56, as described above (typically by a distance of one or two teeth 57, for example).

When the direction of pivoting or oscillation motion of the upward extension 48, the converter housing 52, the plunger housing 70 and thus the feed plunger 50 all stop and then reverse direction, due to further rotation of the cam 42, the plunger housing 70 will first pivot, about the plunger pivot pin(s) 76, until the plunger housing 70 abuts against the opposite inwardly facing surface of the converter housing 52. Thereafter, as the upward extension 48, the converter housing 52, the plunger housing 70 and thus the feed plunger 50 all continue to oscillate in the same direction, such further oscillation thereby causes the inclination of the angled end side 64 of the gear engaging end 60 of the feed plunger 50 to slide up along the surface of the corresponding tooth 57 of the converter gear 56, against the resilient force of the plunger spring 68, and temporarily out of engagement with the associated tooth 57 of the converter gear 56. In such case, therefore, the return oscillation motion of the upward extension 48, the converter housing 52, the plunger housing 70 and thus the converter plunger 50 will not act upon the converter gear 56 so that the feed shaft 26 will not be correspondingly rotated in the opposite direction during such return pivoting motion of the cam follower 46 and the associated components. That is, typically the feed shaft 26 typically has some sort of brake mechanism (not shown) which provides the feed shaft 26 with sufficient friction so that the angled end side 64 of the feed plunger 50 does not rotate the feed shaft 26 in the opposite direction during return motion of the cam follower 46.

An important improvement of the present invention generally relates to the manner in which the feed plunger 50 is supported within the converter housing 52 which is attached to the upward extension 48—e.g., the plunger is pivotably supported with respect to both the converter housing 52 and the upward extension 48 rather than being fixedly supported to those components as is conventional in the art. To achieve a "waddling" motion of the feed plunger 50, as the cam follower 46 oscillates back and forth during rotation of the cam 42, and as shown in FIG. 1B, the feed plunger 50 is accommodated within a plunger housing 70 and the plunger housing 70 is pivotally supported by the upward extension 48 so as to be able to pivot—see arrow A—relative to both the upward extension 48 and the converter housing 52. A further discussion concerning the such waddling or pivoting motion of the plunger housing 70 and the plunger 50 is provided below.

As can be seen in FIGS. 1B-1D, the converter housing 52 is fixed to the upward extension 48 of the cam follower 46 and has an exterior surface 72. The converter housing 52 encloses the plunger housing 70 that, in turn, accommodates both the feed plunger 50 and the plunger spring 68. The plunger housing 70 is pivotally mounted to the upward extension 48 and the converter housing 52 by at least one and generally a pair of spaced apart but axially aligned plunger pivot pin(s) 76, one being pivotally supported by the upward extension 48 and the second being pivotally supported by the converter housing 52. Such pivotal mounting of the plunger housing 70 to one or both of the upward extension 48 and the converter housing 52, by the plunger pivot pin(s) 76 or possibly a shaft, thereby allows the plunger housing 70 and the feed plunger 50 to oscillate or pivot about or through the angle A centered on the plunger pivot pin(s) 76 and extending to either side of the radius between the plunger pivot pin(s) 76 and the axis of the converter gear 56. The maximum value of the angle A is defined and limited by the degree of rotation of the plunger housing 70 about the plunger pivot pin(s) 76 that is permitted within the converter housing 52.

The angle A of permissible rotation of the plunger housing 70 and thus feed plunger 50, with respect to the axis of the converter gear 56 and thus with respect to the surfaces of the teeth 57 may be adjusted by set screws 78 and thumb screws 59. Adjustment of the angular movement of the plunger housing 70, about plunger pivot pin 76, and of the frictional force exerted by the angled end side 64 of the feed plunger 50, on the faces of the teeth 57, thereby provide additional control of the angular rotation of the feed shaft 26, per rotation of the boring bar 12, and thus the incremental axial distance moved or indexed by the boring bar 12 during each complete rotation of the boring bar 12.

In a presently preferred embodiment of the boring bar mechanism 10 as illustrated in FIGS. 1B-1D, the plunger 50 is rotatable within and with respect to the plunger housing 70 by, for example, a feed direction handle 80, thereby allowing selection of the orientation of the angled end side 64 and the flat end side 62 of the feed plunger 50 with respect to the teeth 57 of the converter gear 56. The orientation of the angled end side 64 and the flat end side 62 of the feed plunger 50, with respect to the teeth 57 of the converter gear 56, in turn, determines the direction of rotation of the feed shaft 26 relative to the direction of rotation of the boring bar 12, as the cam follower 46 oscillates back and forth, and thus the direction of the axial motion along axis R imposed on the boring bar 12 and the tool(s) by the threaded section 33 acting through the feed coupling 28.

For this purpose, the upper end of plunger housing 70 includes a pair of opposed direction selection slots 82 and 84 which are located on opposite sides of the plunger housing 70 for receiving and retaining the feed direction handle 80, once the feed plunger 50 is pulled upward, against the resilient bias of the plunger spring 68, and rotated and aligned with a desired one of the direction selection slots 82 or 84 to thereby select the desired rotational direction of the converter gear 56 and the feed shaft 26, e.g., when the feed direction handle 80 engages with the direction selection slot 82, the converter gear 56 and the feed shaft 26 are both rotated in the counterclockwise direction, and when the feed direction handle 80 engages with the direction selection slot 84, the converter gear 56 and the feed shaft 26 are both rotated in the clockwise direction.

Lastly, it will be noted that, as illustrated in FIG. 1A, the axial translation mechanism 24 further includes, as briefly referenced above, a manual feed wheel 36 which is coupled to the feed shaft 26 through a gearing mechanism (not shown) for rotating the feed shaft 26 independently of the converter mechanism 34. For this purpose, the upper end of plunger housing 70 generally includes at least a third disengaged selection slot 86, oriented at right angles to both of the direction selection shots 82 and 84, thereby orienting the angled end side 64 and the flat end side 62 of the waddle plunger 50 at a right angle with respect to the teeth 57 of the converter gear 56. When the direction handle 80 engages with the third disengaged selection slot 86, the feed plunger 50 is generally completely disengaged from and does not interact with the converter gear 56 or cause rotation of the converter gear 56. In addition, when the feed plunger 50 is disengaged from the converter gear 56, the manual feed wheel 36 may be used by an operator, for example, to manually drive the feed shaft 26 and thus the boring bar 12 to a desired axial position within the bore 18 being repaired or refurbished. Such manual positioning is typically utilized at the start of an operation on the bore 18 being repaired or refurbished and also facilitate removal from or reinsertion of the boring bar 12 into the bore 18 being repaired or refurbished.

In summary, therefore, the direction of rotation of the feed shaft 26. and thus of the threaded section 33. is determined by the orientation of the gear engaging end 60 and the flat and angled end sides 62 and 64 of the feed plunger 50, while the angle by which feed shaft 26 is rotated due to each rotation of the boring bar 12 is determined by, for example, the geometry and the centers of rotation of the cam follower 46, the boring bar 12 and the diameter and geometry of the teeth 57 of the converter gear 56, as described above and the degree of waddle or pivot of the plunger housing 70 with respect to the converter housing 52. It will also be recognized that the angle through which the feed shaft 26 is rotated for each rotation of the boring bar 12 is determined, in part, by the pitch of the teeth 57, as well as by the geometry and the centers of rotation of the cam follower 46, the boring bar 12 and the diameter and geometry of the teeth 57 of the waddle gear 56.

Figures 1E, 1F:
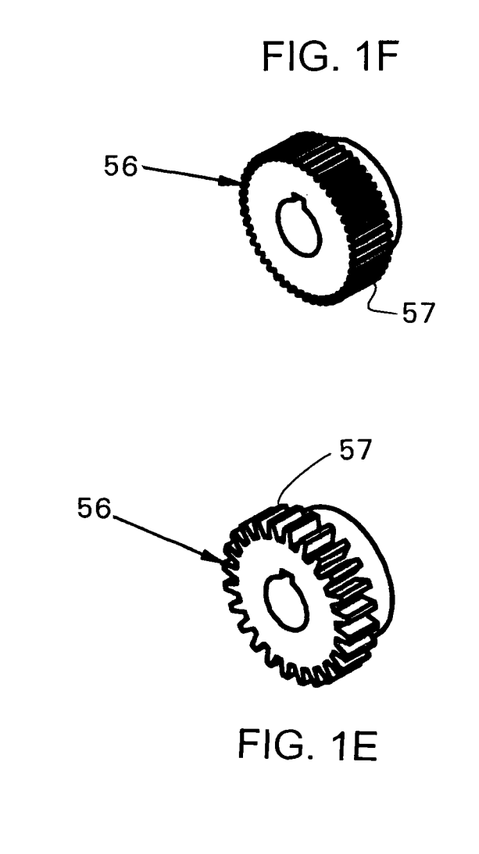
FIG. 1E is a diagrammatic perspective view showing a conventional converter gear having a relatively coarse feed.
FIG. 1F is a diagrammatic perspective view of showing a converter gear having a relatively fine feed for incremental fine indexing according to the present invention.

With reference to FIG. 1E, a conventional converter gear 56 is shown which has a relatively coarse gear ratio, e.g., a total of 18 gear teeth provided about the circumference of the converter gear 56 so that generally only one tooth 57 is indexed each time the cam follower 46 oscillates back and forth. As shown in FIG. 1F, a converter gear 56, in accordance with the present invention, is shown which has a relatively fine gear ratio, e.g., a total of 36 gear teeth provided about the circumference of the converter gear 56. The additional teeth 57 as well as the closer spacing between the teeth 57 allow adjustment of the pivot of the waddle mechanism so that one or possibly two teeth 57 may be indexed each time the cam follower 46 oscillates back and forth.

As noted above, it is important that both the plunger housing 70 and the feed plunger 50 be able to pivot with respect to both the converter housing 52 and the upward extension 48 of the cam follower 46 about the pivot axis defined by the plunger pivot pin 76. To accomplish such pivoting movement, the exterior surface 88 of the plunger housing 70 is spaced from each inwardly facing surface of the converter housing 52 typically by a distance of between about 1/16 of an inch and about 1 of an inch, preferably about 3/8 of an inch. By adjusting the locations of the thumb screws 59 and/or the set screws 78, amount of pivoting motion of the plunger housing 70 and the feed plunger 50 with respect to both the converter housing 52 and the upward extension 48 can be adjusted as desired. That is and for example, if the thumb screws 59 and/or the set screws 78 are all fully retracted within the converter housing 52, then the plunger housing 70 and the feed plunger 50 will have its full range of pivoting motion and index two teeth at a time, during oscillation of the cam follower 46. If the thumb screws 59 and/or the set screws 78 are adjusted toward the plunger housing 70 (see FIG. 1D), then the range of pivoting motion of the plunger housing 70 and the feed plunger 50 with respect to both the converter housing 52 and the upward extension 48 is thereby restricted and the plunger housing 70 and the feed plunger 50 may only index one tooth at a time, for example, during oscillation of the cam follower 46. If the thumb screws 59 and/or the set screws 78 are adjusted so as to prevent any pivoting of the plunger housing 70 and the feed plunger 50 with respect to the converter housing 52, then the plunger housing 70 and the feed plunger 50 become fixed to and move with the converter housing 52 and the upward extension 48.

Figure 2A:
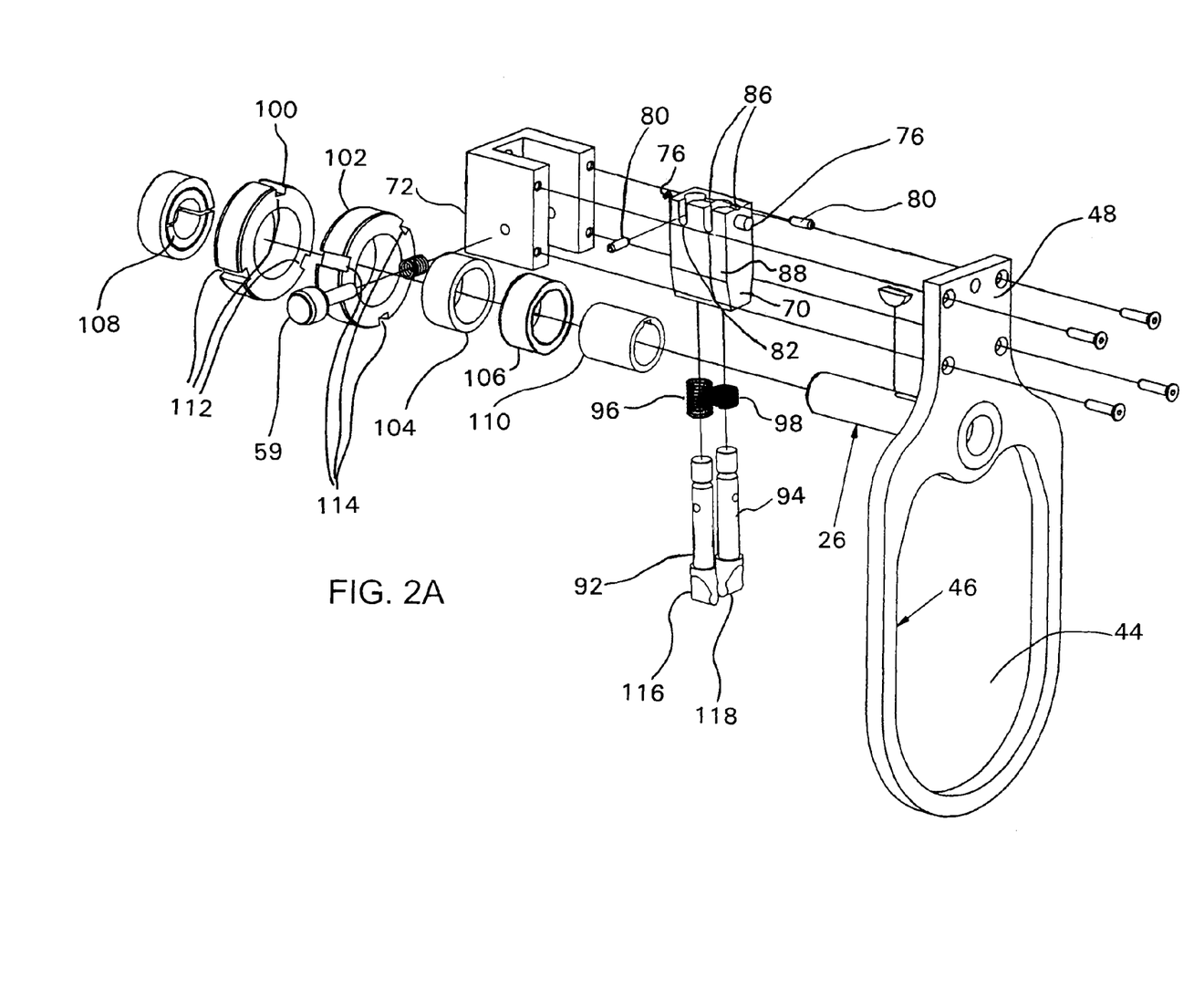
FIG. 2A is an exploded perspective view showing various components of an alternative embodiment of the axial translation mechanism, according to the present invention, for achieving an infinitely variable feed mechanism.
Figure 2B:
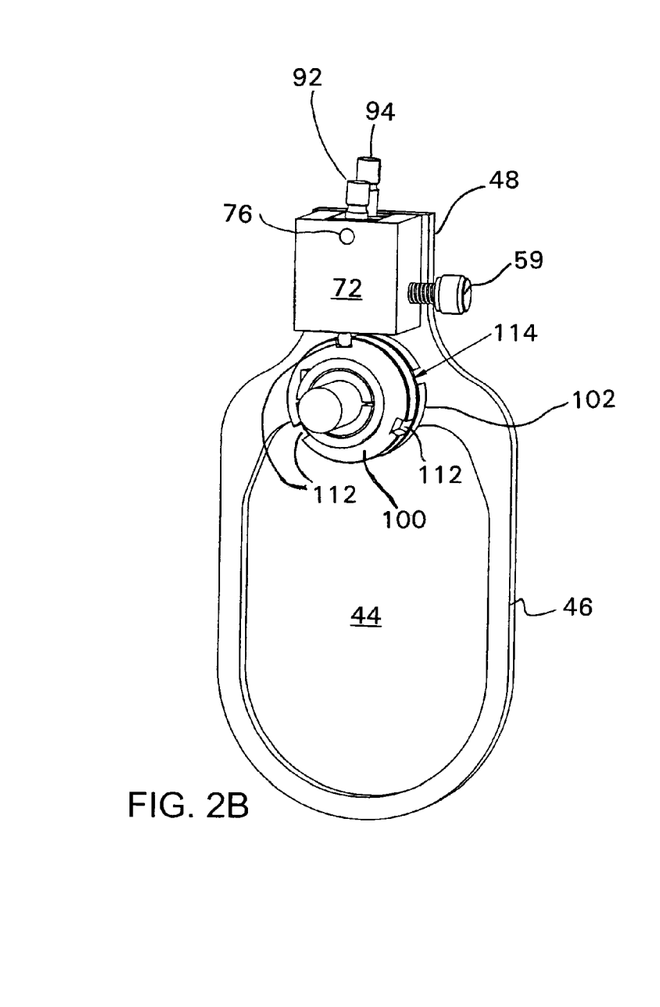
FIG. 2B is a diagrammatic perspective view of the axial translation mechanism of FIG. 2A.
Figure 2C:
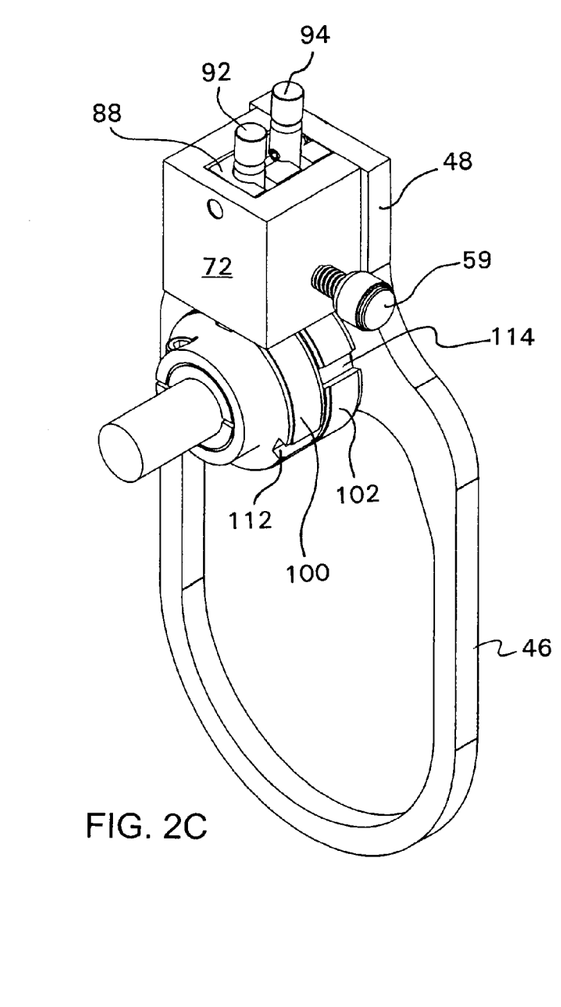
FIG. 2C is an another diagrammatic perspective view of the axial translation mechanism of FIG. 2A.

Referring now to FIGS. 2A, 2B and 2C, a yet further alternative embodiment of axial translation mechanism 24 and, in particular, of the converter mechanism 34 is shown therein.

In this embodiment, the plunger housing 70 is again pivotally mounted to upward extension 48 by either one or a pair of axially aligned plunger pivot pins 76, one being pivotally supported by the upward extension 48 and the second being pivotally supported by the converter housing 52, thereby allowing the plunger housing 70 and the feed plunger 92, 94 to rotate about an angle A centered on the plunger pivot pins 76 with the reciprocating motion of the cam follower 46, as described with reference to the embodiments of FIGS. 1A-1D.

In this embodiment, however, the plunger housing 70 has an exterior surface 88 and contains two feed plungers, respectively designated as feed plungers 92 and 94. Each feed plunger 92, 94 has a corresponding plunger spring which is correspondingly designated as plunger springs 96 and 98. As diagrammatically shown, the feed plungers 92, 94 and their corresponding plunger springs 96 and 98 are arranged within the plunger housing 70 so as to be aligned along the axis of feed shaft 26.

In addition, the converter gear 56 of the previously described embodiments is replaced by first and second plunger engagement rings 100 and 102 which are respectively non-rotationally mounted onto first and second one way bearings 104 and 106. The first and second one way bearings 104 and 106 are, in turn, rotationally supported on a single clutch sleeve 110 which is non-rotatably fixed to the fed shaft 26 by set screws (not shown), for example. A collar 108 retains all of these components correctly position along the feed shaft 26 and prevents axial movement thereof. As is well known to those of ordinary skill in the relevant art, each one way bearing freely rotates in a first direction with respect to the clutch sleeve 110, but non-rotationally engages with the clutch sleeve 110 when rotated in the opposite direction to force the clutch sleeve 110 and thus the feed shaft 26 to rotate with the one way bearing(s). One way bearings 104 and 106 thereby operate in conjunction with the clutch sleeve 110 to form a one way rotation mechanism that is basically similar in operation to the one way rotation mechanism formed of the feed plunger 50 and the converter gear 56, in the embodiment of FIGS. 1A-1D.

The mechanisms comprise first and second plunger engagement rings 100 and 102, first and second one way bearings 104 and 106 and the clutch sleeve 110 thereby convert the bidirectional reciprocating motion, imparted to either the first or the second plunger engagement ring 100 or 102 by the respective feed plunger 92 or 94 and the reciprocating motion of the upward extension 48 of the cam follower 46, into desired corresponding one way rotation of the feed shaft 26.

In the embodiment illustrated in FIGS. 2A, 2B and 2C, one way bearings 104 and 106 are oriented in opposite directions of rotation on the clutch sleeve 110 so that the first and the second plunger engagement rings 100 and 102 accordingly can and will respectively separately interact with the clutch sleeve 110, one at a time, and thus with the feed shaft 26 to rotate the feed shaft 26 in opposite rotational directions, depending upon which of the first and the second plunger engagement rings 100 or 102 is active.

As shown in FIGS. 2A, 2B and 2C, the first and the second plunger engagement rings 100, 102 and the first and the second one way bearings 104, 106 and the clutch sleeve 110 are aligned sequentially and adjacent to one another along the feed shaft 26 and in alignment with a corresponding one of feed plungers 92 or 94, so that the feed plunger 92, 94 respectively engage with the first and the second one way bearings 104 and 106, in particular, with one of the plunger engagement slots 112 formed in the outer circumference of the plunger engagement ring 100 or one of the plunger engagement slots 114 formed in the outer circumference of the plunger engagement ring 102. As described below, the engagement of either of the feed plungers 92 or 94 with the corresponding one of the one way bearings 104 or 106, which are supported on the feed shaft 26 via clutch sleeve 110, will thereby cause the rotation of one of the one way bearings 104 or 106 and thus of the feed shaft 26 by the oscillating motion of the plunger housing 70 due to the oscillating motion of the cam follower 46 as the boring bar 12 rotates.

Because the first and the second one way bearings 104 and 106 can each rotate in only one direction with respect to the clutch sleeve 110, which is non-rotatably fixed to the feed shaft 26, the feed shaft 26 will be rotated in a direction determined by which one of the feed plungers 92 or 94 is engaged with its respective one way bearing 104 or 106. For this reason, each of the feed plungers 92 and 94 is provided with a protruding feed handle 80 that may be: (a) engaged with a desired one of the direction selection slots 82 or 84 to allow the respective feed plunger 92 or 94 to engage with the corresponding one of the plunger engagement rings 100 or 102 and induce the desired clockwise or counterclockwise rotation of the feed shaft 26, or (b) engage with a disabled or disengaged selection slot 86 which restrains the corresponding feed plunger 92 or 94 out of engagement with the corresponding one of the plunger engagement rings 100 or 102. It is to be appreciated that only one of the feed plungers 92 or 94 will be engaged with a corresponding one of the plunger engagement rings 100 or 102 while the other one of the feed plungers 94 or 92 will be engaged with the disabled or disengaged selection slot 86 so as to be positioned out of engagement with corresponding one of the plunger engagement rings 102 or 100.

As also shown in FIG. 2A, the engaging ends 116 and 118 of the feed plungers 92, 94 are sized to closely fit into one of the respective plunger engagement slots 112 and 114 of the plunger engagement rings 100, 102 and may be rounded into partial circular shapes in the planes of the plunger engagement rings 100 and 102. The rounded engaging ends 116, 118 of the feed plungers 92 and 94 thereby form pivot connections between the engaging ends 116 and 118 of the feed plungers 92 and 94 and the respective plunger engagement slots 112 and 114 of the plunger engagement rings 100, 102 when respective engaging ends 116 and 118 are engaged with the plunger engagement slots 112 and 114.

The reciprocating motions of the feed plungers 92 and 94, about angle A of the plunger pivot pin 76 during the oscillation of the cam follower 46 about the feed shaft 26, as the boring bar 12 rotates, thereby causes corresponding reciprocating oscillation motions of the engaging ends 116 and 118 of the feed plungers 92 or 94, which are transferred to one of the first and the second one way bearings 104, 106, through the pivoting connections comprising the engaging ends 116 and 118 and the plunger engagement slots 112 and 114 of the plunger engagement rings 100, 102. The reciprocating motion of the plunger engagement rings 100, 102 is then, as described above, transformed into opposing one way rotation of the feed shaft 26 by a respective one of the one way mechanisms comprising the first and the second plunger engagement rings 100 and 102, the first and the second one way bearings 104 and 106 and the clutch sleeve 110 to rotate the feed shaft 26 in a desired rotational direction.

According to the embodiment illustrated in FIGS. 2A, 2B and 2C, the one way mechanisms as just described above in combination with the pivoting connections between the feed plungers 92 and 94 and the first and the second plunger engagement rings 100 and 102, as described just above, allow the feed shaft 26 to be rotated by a continuously variable increment rather than by a fixed incremental step as described with regard to the converter gear 56 mechanism described with reference to FIGS. 1A-1D. These features of the converter mechanism 34, as illustrated in FIGS. 2A, 2B and 2C, also allow the rate of rotation of the feed shaft 26, during each rotation of the boring bar 12, to be selected as a continuously variable function rather than as a discrete, fixed step and to thereby be more finely selected and controlled by controlling the angle A of oscillation of the plunger housing 70 and the frictional force required to move the feed plungers 92 and 94 and to rotate the one way bearings 104, 106 and the clutch sleeve 110.

In this regard, It will also be noted that the converter mechanism 34, as illustrated in FIGS. 2A, 2B and 2C, generally includes only a thumb screw 59 but may also include an additional thumb screw 59 and a pair of set screws 78, as described with respect to FIGS. 1A-1F, to allow adjustment of the range of angular movement of the plunger housing 70 about the plunger pivot pins 76 and thus the degree of drive of the travel of the respective one way bearing.

It must also be noted that while the plunger engagement rings 100 and 102 are shown as provided with a plurality of the plunger engagement slots 112 and 114, the feed plunger 92 or 94 will engage with only a single plunger engagement slot 112 or 114 during repair or refurbishing of a bore 18. The plunger engagement rings 100 and 102 are provided, for convenience, with a plurality of plunger engagement slots 112 and 114 to facilitate engaging with the feed plunger 92 or 94 when, for example, initializing the axial location of the feed shaft 16 and the boring bar 12 at the beginning of an operation.

Figure 3:
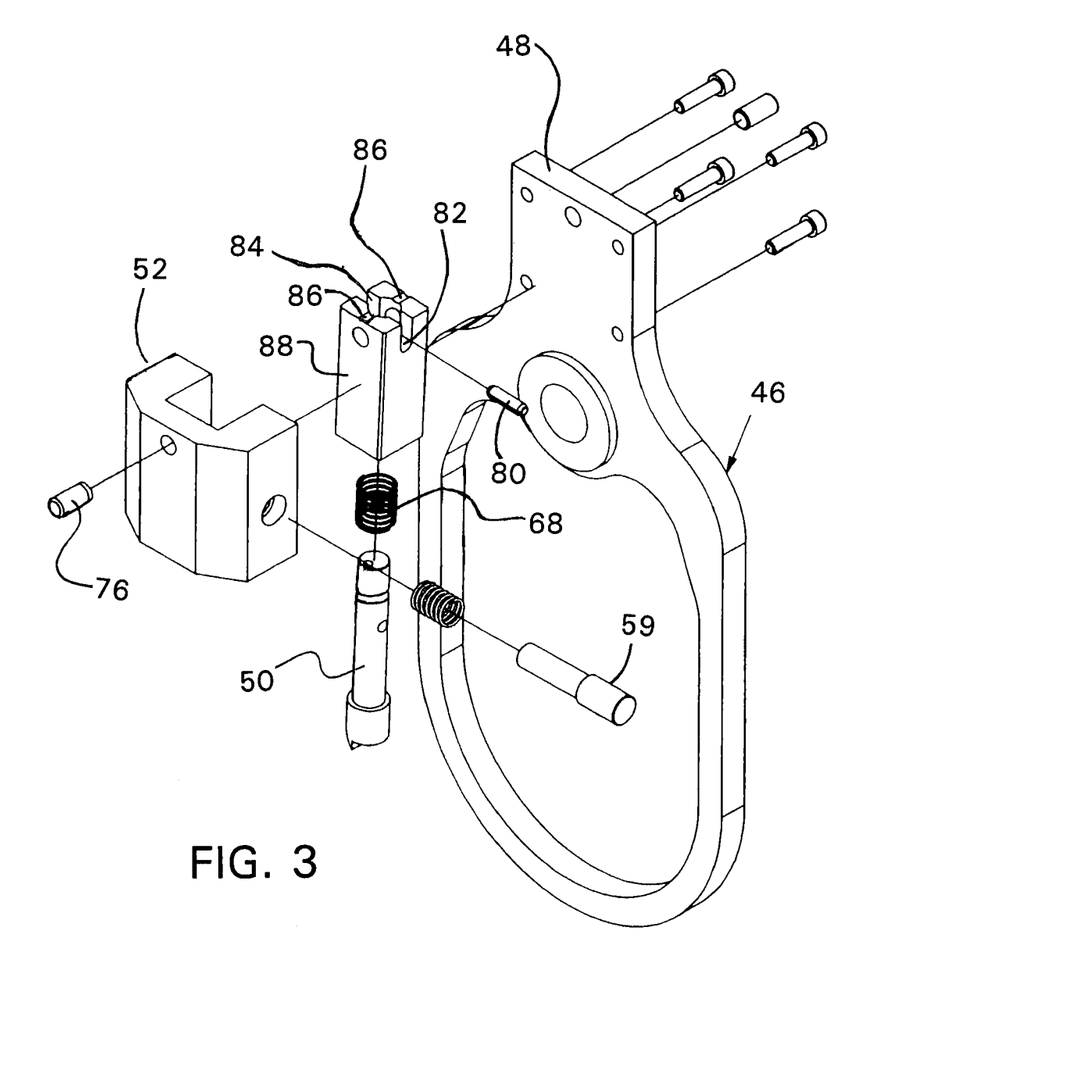
FIG. 3 is an exploded perspective view of a simplified version of the first embodiment according to the present invention.

With reference now to FIG. 3, a brief description concerning a still further embodiment of the improved boring bar feed mechanism, according to the present invention, will now be discussed. As this embodiment is very similar to the first embodiment in a number of respects, identical elements or features are given identical reference numerals. As such, only the differences between this embodiment and the first embodiment will be discussed in detail.

The primary difference of this embodiment is that the overall design of the boring bar feed mechanism is simplified. In particular, according to this embodiment, the converter housing 52, as illustrated in FIG. 3, only includes a single thumb screw 59 and does not include a second thumb screw or the pair of set screws 78, as described with respect to FIGS. 1A-1F. The single thumb screw 59 still adequately allows adjustment of the range of angular movement of the plunger housing 70, about the plunger pivot pin(s) 76 between the inwardly facing surfaces of the converter housing 52. That is, the single thumb screw 59 allows adjustment of the range of movement that the plunger housing 70 is able to waddle or pivot, and thus the feed plunger 50, before abutting against one of the inwardly facing surfaces of the converter housing 52. Once this occurs, any further pivoting motion of the converter housing 52 and the upward extension 48 of the cam follower 46 also induces a corresponding pivoting motion of the plunger housing 70 and the plunger 50 by a corresponding amount.

Since certain changes may be made in the above described improved feed mechanism for feeding a boring bar, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A boring bar feed mechanism comprising:
    a rotatable and axially translatable cylindrical boring bar having at least one tool holder located adjacent a working end of the boring bar for supporting at least one bore tool;
    a rotation mechanism for selectively rotating the boring bar in a rotational direction while allowing axial translation of the boring bar;
    an axial translation mechanism for axially translating the boring bar, the axial translation mechanism comprising a feed shaft extending parallel to and spaced from the boring bar and having a threaded section located at least adjacent the working end the boring bar and the threaded section extending over at least an axial length of the feed shaft corresponding to an axial range of motion of the boring bar;
    a feed coupling extending between and generally perpendicular to the feed shaft and the boring bar for axially translating the boring bar due to rotation of the feed shaft, the feed coupling comprising a threaded coupler rotationally and axially fixed into a first end of the feed coupling and engaging with the threaded section so that the feed coupling is driven in an axial direction along the feed shaft by rotation of the feed shaft;
    the boring bar being rotationally mounted within a coupling bore in a second end of the feed coupler and axially fixed in the coupling bore of the feed coupler so that the boring bar is axially moved by axial movement of the feed coupling upon rotation of the feed shaft;
    a cam being rotationally fixed to the boring bar for rotating with the boring bar;
    a cam follower, having an extension, interacting with the cam;
    a plunger housing being supported by the extension of the cam follower, and the plunger housing accommodating at least one feed plunger;
    a converter gear being supported by the feed shaft; and
    the at least one feed plunger interacting with the converter gear to facilitate indexing of the converter gear supported by the feed shaft;
    wherein the plunger housing is pivotally supported by the extension of the cam follower to permit the plunger housing and the feed plunger to have a limited pivoted motion relative to the cam follower as the cam follower oscillates back and forth and indexes the feed shaft; and the converter gear has a relatively fine gear ratio which permits indexing of two teeth of the converter gear for each oscillation of the cam follower.

2. The boring bar feed mechanism according to claim 1, wherein the converter gear has a total of 36 gear teeth provided about a circumference of the converter gear, and the converter gear permits indexing of either one or two teeth of the converter gear for each oscillation of the cam follower.

3. The boring bar feed mechanism according to claim 1, wherein the plunger housing is surrounded by a converter housing which is attached to the extension of the cam follower, and an exterior surface of the plunger housing is spaced from an inwardly facing surface of the converter housing by a distance of between about $1/16$ of an inch and about 1 inch.

4. The boring bar feed mechanism according to claim 1, wherein the plunger housing has at least one thumb screw which facilitates adjustment of an amount of pivoting motion of the plunger housing with respect to the converter housing so as to adjust an amount of teeth of the converted gear which are indexed during each complete oscillation of the cam follower.

5. The boring bar feed mechanism according to claim 1, wherein the plunger housing has a pair of opposed thumb screws which each facilitate adjustment of an amount of pivoting motion of the plunger housing with respect to the converter housing so as to adjust an amount of teeth of the converted gear which are indexed during each complete oscillation of the cam follower.

6. The boring bar feed mechanism according to claim 1, wherein the plunger housing is pivotally mounted to the extension by a plunger pivot pin.

7. The boring bar feed mechanism according to claim 1, wherein the plunger housing is pivotally mounted to the extension by a pair of axially aligned plunger pivot pins.

8. A boring bar feed mechanism comprising:
    a rotatable and axially translatable cylindrical boring bar having at least one tool holder located adjacent a working end of the boring bar for supporting at least one bore tool;
    a rotation mechanism for selectively rotating the boring bar in a rotational direction while allowing axial translation of the boring bar;
    an axial translation mechanism for axially translating the boring bar, the axial translation mechanism comprising a feed shaft extending parallel to and spaced from the boring bar and having a threaded section located at least adjacent the working end the boring bar and the threaded section extending over at least an axial length of the feed shaft corresponding to an axial range of motion of the boring bar;
    a feed coupling extending between and generally perpendicular to the feed shaft and the boring bar for axially translating the boring bar due to rotation of the feed shaft, the feed coupling comprising a threaded coupler rotationally and axially fixed into a first end of the feed coupling and engaging with the threaded section so that the feed coupling is driven in an axial direction along the feed shaft by rotation of the feed shaft;
    the boring bar being rotationally mounted within a coupling bore in a second end of the feed coupler and axially fixed in the coupling bore of the feed coupler so that the boring bar is axially moved by axial movement of the feed coupling upon rotation of the feed shaft;
    a cam being rotationally fixed to the boring bar for rotating with the boring bar;

a cam follower, having an extension, interacting with the cam;

a plunger housing being supported by the extension of the cam follower, and the plunger housing accommodating at least one feed plunger;

a converter gear being supported by the feed shaft; and the at least one feed plunger interacting with the converter gear to facilitate indexing of the converter gear supported by the feed shaft;

wherein the plunger housing is pivotally supported by the extension of the cam follower to permit the plunger housing and the feed plunger to have a limited pivoted motion relative to the cam follower as the cam follower oscillates back and forth and indexes the feed shaft; and the plunger housing is pivotally supported by the extension of the cam follower so as to permit indexing of either one or two teeth of the converter gear.

9. A boring bar feed mechanism comprising:

a rotatable and axially translatable cylindrical boring bar having at least one tool holder located adjacent a working end of the boring bar for supporting at least one bore tool;

a rotation mechanism for selectively rotating the boring bar in a rotational direction while allowing axial translation of the boring bar;

an axial translation mechanism for axially translating the boring bar, the axial translation mechanism comprising a feed shaft extending parallel to and spaced from the boring bar and having a threaded section located at least adjacent the working end the boring bar and the threaded section extending over at least an axial length of the feed shaft corresponding to an axial range of motion of the boring bar;

a feed coupling extending between and generally perpendicular to the feed shaft and the boring bar for axially translating the boring bar due to rotation of the feed shaft, the feed coupling comprising a threaded coupler rotationally and axially fixed into a first end of the feed coupling and engaging with the threaded section so that the feed coupling is driven in an axial direction along the feed shaft by rotation of the feed shaft;

the boring bar being rotationally mounted within a coupling bore in a second end of the feed coupler and axially fixed in the coupling bore of the feed coupler so that the boring bar is axially moved by axial movement of the feed coupling upon rotation of the feed shaft;

a cam being rotationally fixed to the boring bar for rotating with the boring bar;

a cam follower, having an extension, interacting with the cam;

a plunger housing being supported by the extension of the cam follower, and the plunger housing accommodating at least one feed plunger;

a converter gear being supported by the feed shaft; and the at least one feed plunger interacting with the converter gear to facilitate indexing of the converter gear supported by the feed shaft;

wherein the plunger housing is pivotally supported by the extension of the cam follower to permit the plunger housing and the feed plunger to have a limited pivoted motion relative to the cam follower as the cam follower oscillates back and forth and indexes the feed shaft; and the plunger housing is pivotally supported by the extension of the cam follower so as to permit of infinitely variable indexing of the converter gear.

10. The boring bar feed mechanism according to claim 9, wherein plunger housing contains two feed plungers and each of the two feed plungers is spring biased toward the converter gear by a corresponding plunger spring.

11. The boring bar feed mechanism according to claim 10, wherein first and second plunger engagement rings are non-rotationally mounted on respective first and second one way bearings, and the first and second one way bearings are rotationally supported on a single clutch sleeve which is non-rotatably fixed to the feed shaft.

12. The boring bar feed mechanism according to claim 11, wherein each one of the plunger engagement rings has at least one plunger engagement slot for engaging with the respective feed plunger and inducing rotation of the feed shaft.

13. The boring bar feed mechanism according to claim 9, wherein each of the feed plungers has a handle that may be engaged with a desired direction selection slot of the plunger housing to facilitate one of engagement of the feed plunger with the corresponding one of the plunger engagement rings and induce the desired rotation of the feed shaft or disengagement of the feed plunger with the corresponding one the plunger engagement rings.

* * * * *